United States Patent [19]

Kelly

[11] Patent Number: 5,703,417

[45] Date of Patent: Dec. 30, 1997

[54] LINEAR MOTOR FOR EXTENDED TRAVEL

[75] Inventor: Hugh-Peter Granville Kelly, Westcliff on Sea, United Kingdom

[73] Assignee: Linear Drives Limited, Essex, United Kingdom

[21] Appl. No.: 535,396

[22] Filed: Sep. 28, 1995

[30] Foreign Application Priority Data

Sep. 30, 1994 [GB] United Kingdom ............... 9419734

[51] Int. Cl.⁶ .................. H02K 41/02; H02K 41/03
[52] U.S. Cl. .................................................. 310/12
[58] Field of Search ........................ 310/12, 13, 14

[56] References Cited

U.S. PATENT DOCUMENTS

| | | | |
|---|---|---|---|
| 4,075,539 | 2/1978 | Wada | 318/135 |
| 4,314,295 | 2/1982 | Frandsen | 310/13 X |
| 4,626,749 | 12/1986 | Asakawa | 318/135 |
| 4,749,921 | 6/1988 | Chitayat | 318/135 |
| 5,087,844 | 2/1992 | Takedomi et al. | 310/12 |
| 5,107,366 | 4/1992 | Huang et al. | 310/13 X |

FOREIGN PATENT DOCUMENTS

| | | |
|---|---|---|
| 7803387 | 6/1987 | Australia. |
| 0373987 | 11/1989 | European Pat. Off.. |
| 61-046165 | 3/1986 | Japan. |
| 61-203863 | 9/1986 | Japan. |

OTHER PUBLICATIONS

Patent Abstracts of Japan, E field, vol.10, No.205, Jul. 17, 1986, p. 61 E 420.

Patent Abstracts of Japan, E field, vol.11, No.36, Feb. 03, 1987, p. 81 E 477.

*Primary Examiner*—Steven L. Stephan
*Assistant Examiner*—Judson H. Jones
*Attorney, Agent, or Firm*—Harness, Dickey & Pierce, P.L.C.

[57] ABSTRACT

In a linear motor, the drive coils ($5a, 5b$) on the armature are formed by a number of sub-coils ($6a_1, 6a_2, 6a_3, 6b_1, 6b_2, 6b_3$) oriented laterally of the motor axis subject to lateral magnetic fields generated by pairs of magnets ($3a, 3b$) on the stator. The sub-coils are so arranged that the fields produced by the adjacent winding portions (8 and 9, 10 and 11) of an adjacent pair of sub-coils are of the same polarity.

16 Claims, 4 Drawing Sheets

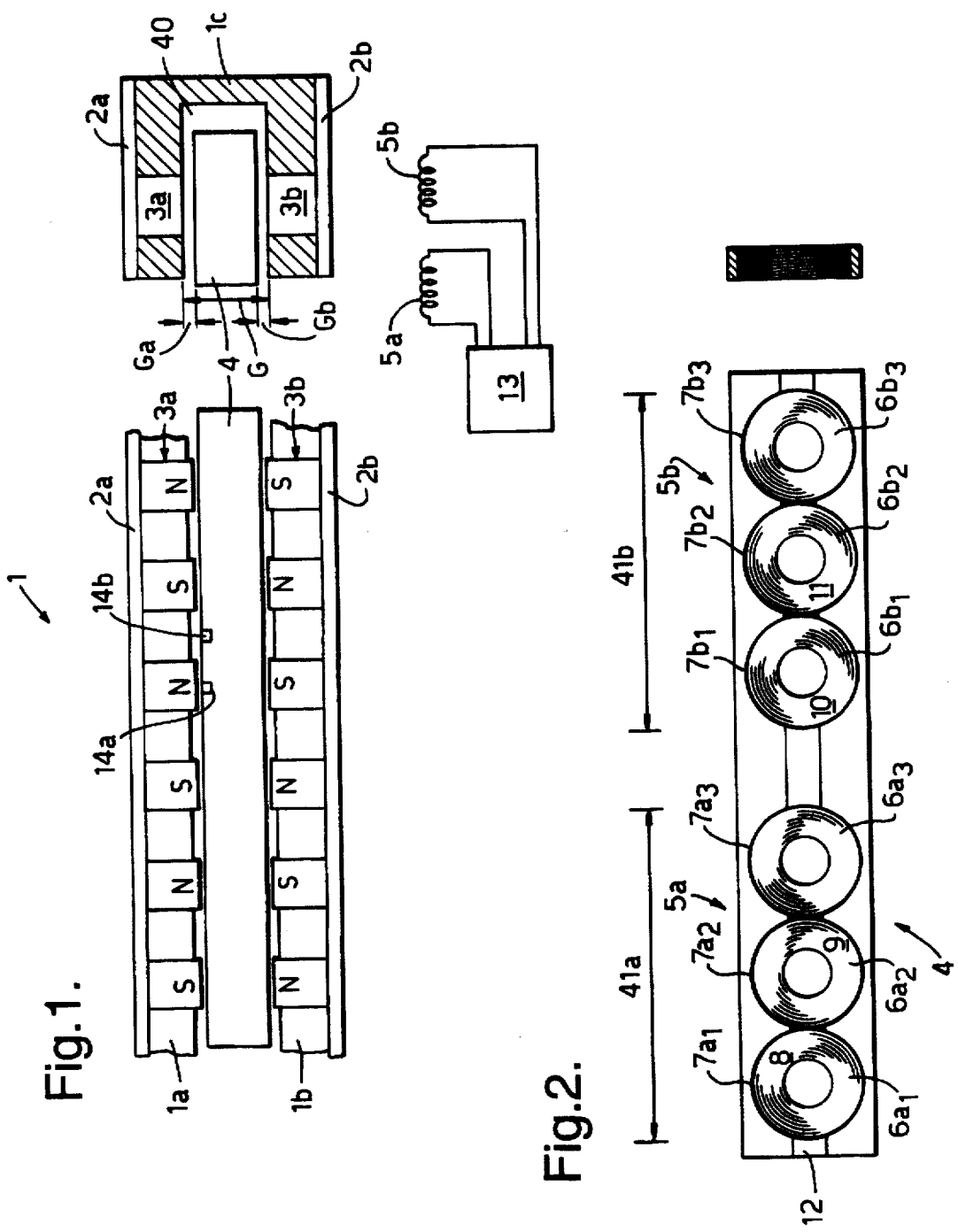

Fig.3.
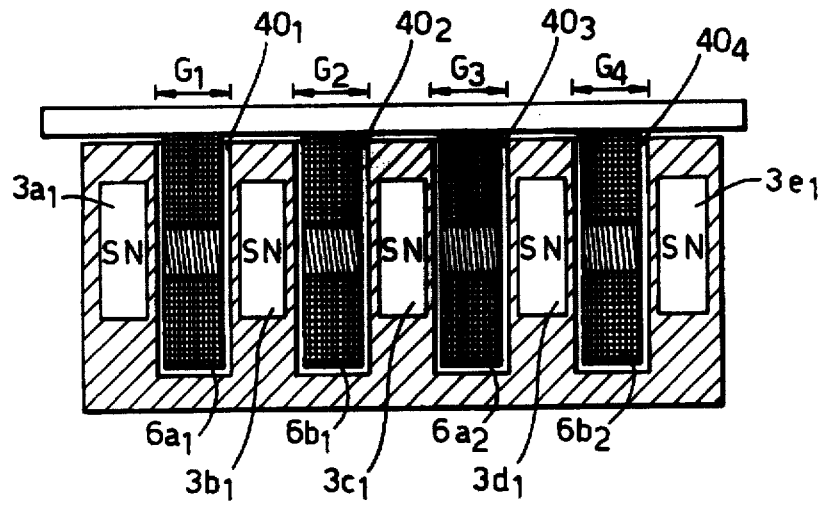
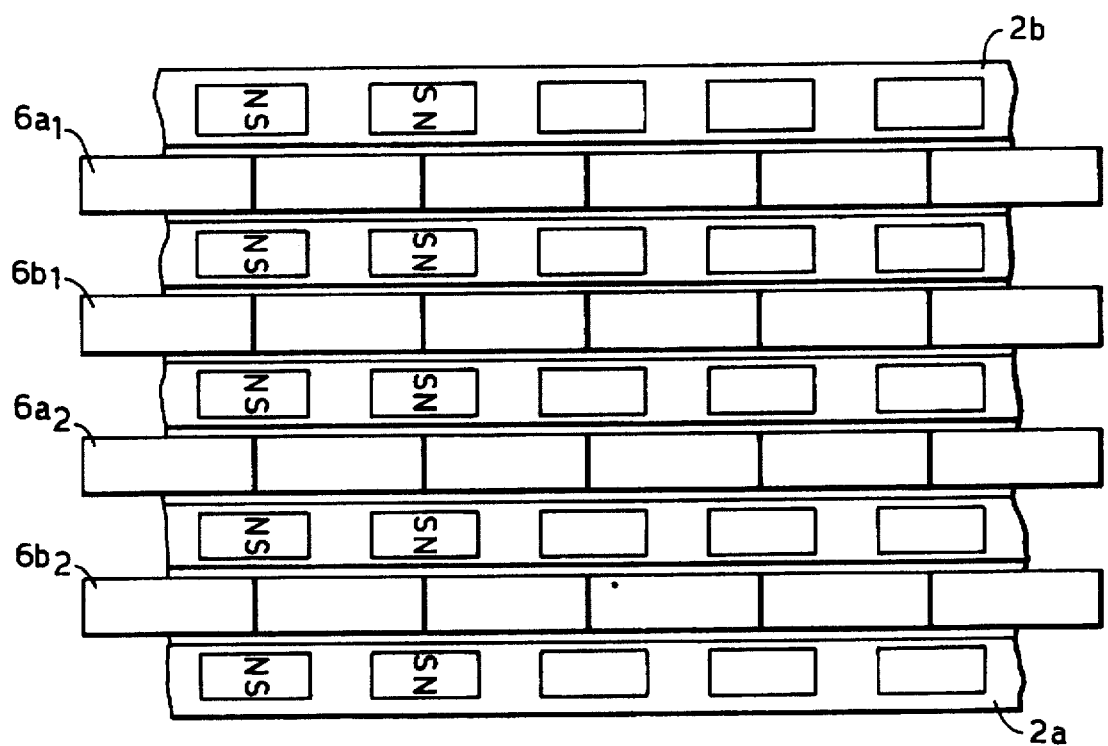

Fig. 7.
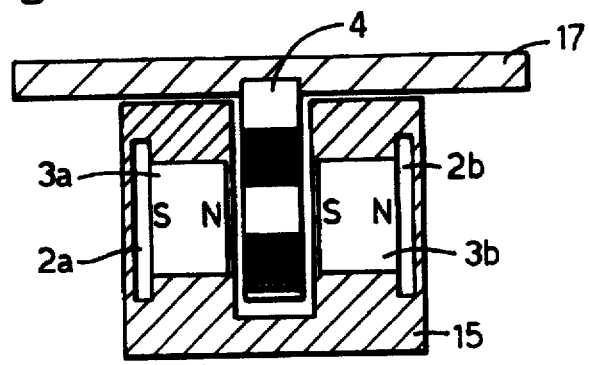
Fig. 8A.
| | COIL 1 | COIL 2 | |
|---|---|---|---|
| | + | o | |
| | o | + | SEQUENCE 1 |
| | − | o | |
| | o | − | |
| | + | o | |
| | + | + ← | |
| | o | + | |
| | − | + ← | SEQUENCE |
| | − | o | |
| | − | − ← | |
| | o | − | |
| | + | − ← | |
Fig. 8B.
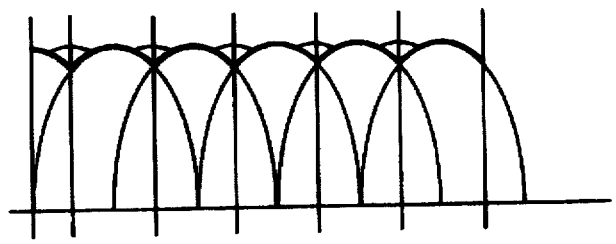

LINEAR MOTOR FOR EXTENDED TRAVEL

The present invention relates to electrodynamic machines of the type known as linear motors.

Linear electric motors have been developed for use in a wide variety of machinery. However, the complexity and cost of construction of many motors of the prior art, combined with the need in many of these designs for bulky iron laminations to complete magnetic field paths, has limited their performance and rendered their cost too high for them to become industry standards where electrically powered linear motion is necessary.

As with rotary motors, it is desirable in any linear motor for the interaction between the magnetic fields created by the stator and rotor to produce as much force as possible. In terms of specific linear motor designs, this means that it is desirable for the windings of the armature drive coils to have as much electrically conducting material (i.e. copper in the vast majority of current designs) per unit length as possible in order to maximise the magnetic field strength available. However, with existing designs, the physical configuration of the coils restricts what is attainable, in terms of copper per unit length.

According to the present invention, there is provided a linear motor comprising:

an armature and a stator moveable relative to one another along a path of movement and having, respectively, first and second sets of magnetic flux generators, the flux generators of the first set being arranged in pairs uniformly spaced at a predetermined pole pitch along the length of said path, the flux generators of each pair being disposed in an opposed relationship to one another to opposite sides of said path and producing magnetic fields across and defining therebetween at least one stator magnetic circuit air gap extending over the length of said path, the polarities of the fields alternating between successive flux generator pairs along said air gap, the second set of flux generators comprising at least two drive coils disposed in said magnetic fields, each drive coil comprising a contiguous set of cylindrical subcoils, the sub-coils of each set having a pole pitch substantially equal to that of the first set of flux generators, the sub-coils of the respective drive coils being disposed such that their axes are directed laterally of said path and such that the axes of the sub-coils of one set are offset longitudinally of the path from those of the other set by an amount differing from said pole pitch, the sub-coils of a drive coil being arranged such that their axes are spaced apart longitudinally of the motor by a distance substantially equal to their maximum diameters and being energisable such that the mutually adjacent portions of the windings of longitudinally successive sub-coils of a coil produce fields of the same polarity.

The fact that the spacing of the axes of the sub-coils is substantially equally to their diameters does not necessarily mean that adjacent sub-coils physically touch one another, though the invention includes such an arrangement. The sub-coils may be conveniently mounted in a series of cylindrical recesses, or more preferably, through-holes, extending laterally of the axis of the motor, in the armature.

A form of linear motor in use internationally does exist in which construction is simple and cost is commensurately low, as well as providing high performance. This is described in my granted patent GB 2079068. However, in this form of motor, the stator of the motor is a cylindrical rod, or elongate bar, and the drive coils are coaxial with and surround the stator. This limits the maximum length of the stator since it can be supported only at its ends and, if too long, will sag in its middle. With the present invention, since the orientation of the flux generators is transverse to the axis of the motor, the stator can be supported either along its entire length or at intervals, so sagging can be avoided. A particularly convenient arrangement can be achieved by configuring the stator to provide one or more longitudinal channels in which the sub-coils of the drive coils are located. This enables the armature to be rigidified, e.g. by using I- or C-beam structural elements to support its flux generators.

The sub-coils of one drive coil need to be longitudinally offset from those of the or each other drive coil by a distance not equal to the pole pitch, so that a net thrust can be produced in a desired direction at any relative longitudinal position of the armature and stator. Preferably the offset is 1/N times the pole pitch where N is the number of drive coils, so as to minimise the variation of thrust with relative longitudinal position.

Preferably the sub-coils of each drive coil are arranged such that substantially nowhere are sub-coils of any one of the coils located in the same longitudinal extent of the air gap as sub-coils of the other coil or coils. This lack of side-by-side overlap enables each sub-coil to substantially fill the entire air gap width, which is the preferred arrangement. Because the abutting sub-coils occupy the full width of the air gap, the benefits of minimising leakage from the coil edges are maximised, in contrast to those designs where the sub-coil can only occupy part of the air gap width, (e.g. one third as in U.S. Pat. No. 4,839,543) and therefore considerable leakage into the slot air gap is possible. This is even more important when considering the advantage provided by the fact that lines of force created by each abutting sub-coil are acting to enhance the overall field created, as clearly no leakage can occur at the coil peripheries over the section where they are substantially in contact. This also happens to be at the central area and therefore the most concentrated field of the permanent magnetic field created by the stator magnets.

The sub-coils of each drive coil may be arranged so that the median planes (i.e. the plane parallel to and mid-way between the ends of the sub-coil) of each set of sub-coils are coplanar, preferably coincident with the motor axes. In that case, the drive coils need to occupy separate longitudinal extents of the armature.

Alternatively the sub-coils of different drive coils can be offset laterally of the motor axis (i.e. so that the sub-coils of one set are spaced laterally of the motor axis by an amount equal to or greater than the widths of the coils), from the sub-coils of the other drive coil(s); this permits the drive coils to overlap longitudinally of the motor axis and is implemented by providing a plurality of parallel air gaps.

The substantial equality of the sub-coil axes spacing and their diameters means that a portion of one half of one coil shares with a portion of the abutting half of its neighbouring coil, a magnetic field generated by one of the magnetic field generators of the stator. It will be appreciated that in this arrangement, assuming, as is preferred, the sub-coils fill the width of the air gap, substantially all the length of the armature is filled with contiguous coils of a particular drive coil. This therefore avoids the waste of space of other arrangements in which either the sub-coils must be spatially separated, or the pole pitch of the stator field generators differ from that of the sub-coils, to achieve movement and which therefore results in less lines of force per unit length of the motor. In addition, these halves of adjacent sub-coils are capable of effecting useful work, when cutting the lines of force caused by the magnetic field generators since they produce fields of the same polarity which therefore do not tend to cancel each others' effect in interacting with the other set of flux generators; rather they reinforce one anothers' effects. This is an important benefit arising from the invention, and can be best illustrated by the fact that the net thrust of a number "n" of contiguous sub-coils interacting with the magnetic fields created by the stator, is greater than "n" times the effect of a single coil fed with the same current. This is simply due to the fact that field leakage can occur from a single coil around its periphery, whereas when juxtaposed against a neighbouring sub-coil creating magnetic field lines in the same direction, such leakage cannot occur to the same extent. The mode of construction has the further advantage that any given thrust requirement can be met simply by adding further sub-coils.

Preferably the set of flux generators which is not provided by the drive coils is a set of permanent magnets.

In one embodiment of the invention, the field generators of the stator comprise two or more rows of permanent magnets spaced along the path of travel which face one another across the path of travel and are so arranged to produce fields of alternating polarity across the path of travel. The spacing of the magnets and therefore of the fields passing between them, is so arranged that the fields cut the sides of abutting sub-coils when they are facing the magnets. In this arrangement, a high utilisation of the magnetic energy provided by the field generators arises.

In a specific realisation of this embodiment of the invention, the permanent magnets are separated circular disc magnets disposed along the length of the stator and magnetically coupled one to the other by a ferromagnetic backing strip (a keeper), disposed on each "outside" face of the stator, and the drive coils comprise a contiguous set of circular sub-coils. In accordance with the provision of the invention, the diameters of the circular sub-coils equal the pole pitch of the permanent magnets.

A disadvantage of virtually all linear motor applications is that inevitably the potential user requires a specific length of travel not suited to the standard linear motor length available. In one form of construction of the above embodiment of the invention, the disc permanent magnets of each row of the stator, are supported by and are incorporated within, at least one elongate housing, which may be cut from an extrusion, in between magnets, to any desired length. Thus, in manufacture, any length can be provided with a minimum of practical difficulty.

The invention will now be described, by way of example only, with reference to the accompanying drawings in which:

FIGS. 1 and 2 illustrate a first embodiment of the invention;

FIG. 3 is a horizontal cross section of component parts of a second embodiment of the linear motor according to the present invention;

FIG. 7 shows a method of assembly of the motor of FIG. 1;

FIGS. 8A and 8B show a switching sequence for the coils of the motor of FIG. 3.

Figure 4:
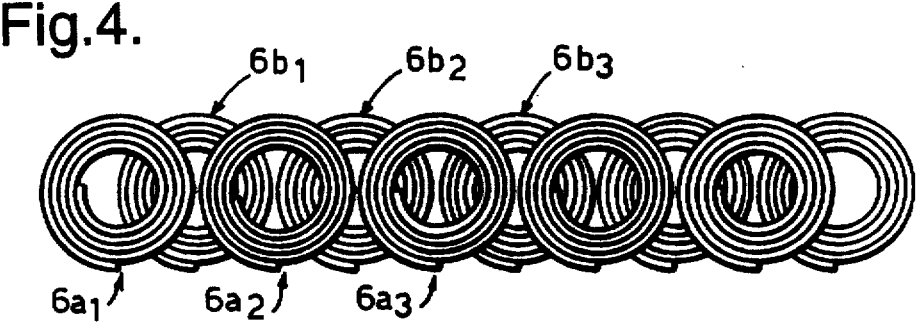
FIG. 4 shows an arrangement of coils of the linear motor of FIG. 3.

FIG. 1 shows a first embodiment of a linear motor according to the invention. The stator of the motor comprises two elongate rectangular bars $1a,1b$ of a non-ferromagnetic material extending over the length of the motor and which are held parallel to one another by rigid spacing posts or webs (not shown) or alternatively by an elongate plate extending parallel to the plane of the figure at one lateral edge of the bars $1a,1b$. Affixed to the outside of each elongate bar are ferromagnetic keepers $2a$ and $2b$, preferably comprising soft iron strips.

The motor 1 is provided with a set of magnetic flux generators comprising opposed pairs $3a,3b$ of cylindrical permanent magnets rigidly secured within the bars $1a,1b$ e.g. by adhesive. The polarities of successive pairs of the magnets $3a,3b$ alternate along the length of the motor as illustrated. This alternation means that an adjacent pair of the magnets $3a$ or $3b$ are connected magnetically by the intervening length of the keepers $2a$ or $2b$ and form a "horseshoe" magnet so that the magnetic flux is concentrated into the gap between magnet $3a$ and the opposed, paired magnet $3b$. A consequence of this is that there is relatively little magnetic leakage flux produced in the region to the other side of the keeper i.e. above the keeper $2a$ and below the keeper $2b$ in FIG. 1, as well as relatively little leakage between adjacent sides of the magnets. It is an important advantage that the magnets can each be spaced from the next, rather than virtually abutting one another. This arises because they are only required to create fields cutting the coils themselves, at their sides. This provides a significant saving in magnetic material and therefore cost in comparison with prior art motors utilising rectangular magnets.

It will be noted from FIG. 1 that the opposed faces of the magnet pairs $3a,3b$ define a stator magnetic circuit air gap G extending across the width (i.e. the height in FIG. 1) of the channel 40 defined between the bars $1a$ and $1b$. Both this stator air gap G and the channel 40 extend over the length of relative movement of the armature and stator of the motor. Where the armature occupies the channel 40, minimal residual air gaps Ga and Gb are left between the inner faces of the bars $1a$ and $1b$ and the lateral faces of the armature 4.

In one arrangement the pole pitch of the magnets is substantially twice their diameter and each magnet has a length substantially equal to half its diameter. The magnets $3a,3b$ of each pair are axially aligned and their opposed faces are spaced apart by a distance comparable with their lengths, leaving the longitudinal gap G through which the armature 4 extends and travels.

The stator 1 can be of any arbitrary length. To enhance its rigidity, the elongate bars thereof $1a,1b$ may form part of an aluminium extrusion as shown at $1c$. It will be appreciated that in this form of the stator, the extrusion $1c$ can be cut, in between magnets, to provide close to any desired length of stator.

The armature 4 is shown to an enlarged scale in FIG. 2. It can be in the form of an elongate rectangular metal, e.g. aluminium, bar and carries two coils $5a$ and $5b$.

Each of the coils $5a,5b$ comprises two or more sub-coils $6a_1,6a_2,6a_3$ and $6b_1,6b_2,6b_3$. These coils are secured in respective apertures $7a_1,7a_2,7a_3$ and $7b_1,7b_2,7b_3$ extending through the stator 4. Within each group of sub-coils, the apertures $7a_1,7a_2,7a_3$ and $7b_1,7b_2,7b_3$, and consequently the sub-coils $6a_1,6a_2,6a_3$ and $6b_1,6b_2,6b_3$ which they accommodate are spaced apart longitudinally by a distance substantially equal to the longitudinal pole pitch of the magnets $3a,3b$ on the stator. Furthermore, the sub-coils of the two coils are longitudinally offset by half the magnet $3a,3b$ pole pitch. In general, there may be N such coils and it will be appreciated, therefore, that in the general case, the longitudinal offset between the sub-cells of the N coils should be 1/N of the pole pitch.

It will be noted from FIG. 2 that the longitudinal regions 4a and 4b occupied respectively by the sub-coils of drive coils 6a and 6b do not overlap so that each sub-coil can fill substantially the entire width of the air gap G (apart from the residual air gaps Ga and Gb). In other words, there is no point at which windings of the sub-coils of different ones of the drive coils are located in the same lateral extent of the air gap G.

In keeping with the concept that the motor should have as much coil conductor material (copper) per unit length of the motor, within each coil, the sub-coils are arranged such that longitudinally adjacent ones of them substantially abut one another at their peripheries, i.e. the spacing between their peripheries is negligible compared with their diameters.

The sub-coils of each coil are arranged such that in the portions of their windings which are adjacent one another as at the regions 8 and 9 and 10 and 11 the currents passing through those winding portions produce magnetic fields of the same polarity. This is fundamental in maximising the amount of thrust which the motor can generate. The production of fields of the same polarity of these portions can be achieved either by alternating the winding sense of the coils or by suitable selection of the polarity of the electrical connections between them or of the polarity of the drive currents applied to them.

The axial extent of each of the sub-coils is substantially equal to the thickness of the armature 4 and is arranged to minimise the air gap. It will be noted from FIG. 2 that the central region of each major face of the armature 4 can be machined to provide a shallow channel 12 to accommodate leads and connections to the coils.

The armature coils are energised by a controller and commutator circuit 13 in FIG. 1 which processes the output of Hall effect magnetic field strength detectors 14a,14b or optical encoder information (not shown, see GB 2106644 B) to determine the longitudinal position of the armature relative to the stator and responds to control signals to provide closed loop servo control of the position of the armature relative to the stator. The controller can further provide for the armature to be energised in a manner to follow a desired velocity profile when moving from one position to another.

In this embodiment, the coils 5a,5b (and their sub-coils ($6a_1,6a_2,6a_3$) are in separate longitudinally spaced regions of the armature. As will become apparent from the description of other embodiments below, they can be arranged side by side (laterally of the motor) so that they overlap longitudinally of the motor without windings of different drive coils needing to coexist (i.e. to overlap) in the same lateral extent of the air gap G.

Thus in FIG. 3, the stator 1 and its permanent magnets provide respective channels $40_1$–$40_4$ and corresponding air gaps $G_1$–$G_4$ for the individual sub-coils $6a_1$, $6b_1$, $6a_2$ and $6b_2$. This arrangement enables the "inner" permanent magnets $3b_1$–$3d_1$ to contribute to the magnetic flux in the air gaps G to either side of them and at the same time enables the longitudinal extent of the armature for a given drive coil configuration to be minimised. By way of a variant of FIG. 3, it is possible to have an arrangement in which there is one channel per drive coil and the sub-coils of each drive coil are all located in the channel assigned to that drive coil.

In the arrangement of FIG. 3 which is intended for heavy duty applications of the motor, the stator is formed as an extrusion comprising five cavities, each filled with a sequence of magnets. The coils comprise four rows, two being for one set of sub-coils, and the other two rows being for the other set. Each row lies directly between facing magnets. In this arrangement, the thrust available is considerably augmented, because each sub-coil occupies the full length available for the armature and can therefore comprise more turns, and secondly, there are of course, double the number of coils active. As can be seen from the figure, the basic design remains compact and highly electromagnetically efficient. Note, the coils of one row of sub-coils of one coil will be connected in the opposite direction to that of their neighbouring row of sub-coils to be consistent with the sense of the magnetic fields passing therethrough.

Figure 5:
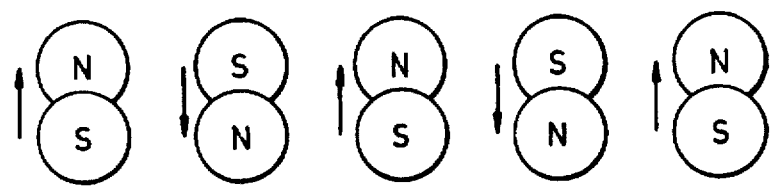
FIG. 5 shows faces of field generators of the stator of the motors of FIG. 3 and FIG. 1.
Figure 6:
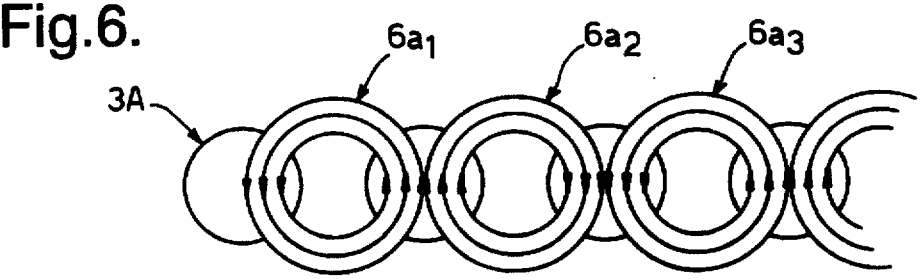
FIGS. 6, 6A and 6b show in detail currents flowing within adjacent sub-coils of the motors of FIG. 3 and FIG. 1.
Figure 6A:
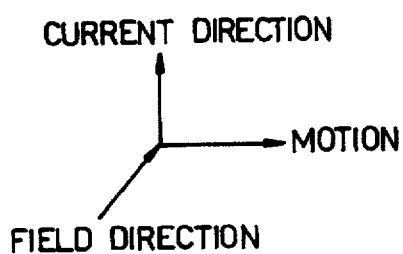
Figure 6B:
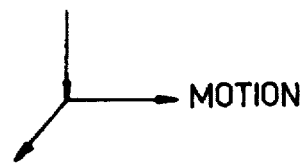

By way of further explanation of FIG. 3, the sub-coils comprise a number of multi-layered disc shaped wound sub-coils physically abutting up against each other as shown in FIG. 4. Sub-coils of one coil are shown as $6a_1,6a_2,6a_3$ etc. and sub-coils of the other coil are shown as $6b_1,6b_2,6b_3$ etc. Importantly, the sub-coils of the two coils overlap laterally as shown in FIG. 3 and FIG. 4. The polarities of the stator magnets (shown) is such that the direction of the polarity of the fields passing therebetween, alternates from one facing pair to the next. This is shown more clearly in FIG. 5, the arrows defining for the sake of reference only, the field direction between the pole faces. As in the coil arrangement shown in FIG. 2, the direction of winding of each sub-coil, or alternatively, the sense of interconnection of each sub-coil, is arranged to be such that the direction of current passing around one side of each sub-coil is the same as that of the abutting side of the neighbouring coil. Thus, when these two abutting sides lie in the gap between facing magnets, each side experiences thrust in exactly the same direction, as dictated by Flemings rule (see FIG. 6a). Looking to the next side of the neighbouring coil, the current is now of course flowing in the opposite direction, as is the current in the side of the next neighbouring sub-coil in line. However, because the magnetic field of the next pair of facing magnets is in the opposite direction also, this provides thrust still in the same direction, see FIG. 6b. Thus, every side of every sub-coil imparts thrust additively in the correct direction, so providing an elegant and extremely space efficient conversion of electromagnetic energy to linear force without the need for iron to complete any magnetic circuit within the armature. Furthermore, each sub-coil in trying to reach a stable position opposite its respective pair of facing magnets, exercises force by virtue of nearly all of its conductors trying to orientate centrally on the magnet. (The alignment of a coil centrally over a magnet when energised is of course well known).

By way of explanation, the magnetic field created by each turn of each sub-coil can be considered as the sum of individual arcs, each of whose magnetic fields can be normalised in terms of a "horizontal vector" parallel to the direction of movement, and a "vertical vector". The sum of the magnetic fields created by each of the discrete vertical vectors interacting with the orthogonal fields provided by the permanent magnets, provides the effective lateral thrust. It can be seen that with the exception of those parts of each sub-coil lying actually parallel with the direction of motion, virtually all of the coil contributes to useful thrust. This is in marked contrast with rectangular or square coils operating in combination with circular or square magnets, in which the portion of the rectangular or square coil lying in the direction of motion, is wasted. A straightforward derivation shows that, other things being equal, a cylindrically wound coil can produce at least 13% more force than the same coil wound in a square configuration when using a cylindrical stator magnet of the same magnetic volume (and therefore price) in each case.

Thus, in this arrangement, a high utilisation of the electrical energy imparted to the coils is realised.

Movement of the coils along the magnets of the stator is achieved by energising the coils in a sequence as illustrated in FIG. 8. Currents are supplied in sequence to cause each coil to try to move to a position of least magnetic salience relative to the fields passing between the magnet faces. The position of least salience is when each sub-coil is oriented directly over a pair of facing magnets. Sequence 1 shown in FIG. 8a shows an elementary form of switching in which each coil is switched to cause step movements of the armature. Note, each coil is switched at half the coil/magnet pitch. Sequence 2 shown in FIG. 8b shows an alternative sequence for establishing smaller step movements, where switching occurs at a quarter coil pitch. By displacing the commutation points in each case by either a quarter, or an eighth of a coil pitch, a continuum of thrust can be obtained as shown in FIG. 8b, rather than carrying out specific steps. By this means, the motor provides for a given supply current, substantially linear force, irrespective of the position of the armature coils relative to the stator. The coils can be commutated by optical or magnetic sensors, in well known fashion, and also can be controlled with a closed loop servo positioning system, for ensuring rapid and precise point to point movements of the armature.

Regarding construction of the motor, a practical design is shown in FIG. 7. A non-ferromagnetic extrusion 15, for example of Aluminium, consists of two parallel cavities linked by a central base. The magnets creating the field patterns are simply inserted along the cavities, having been first prelocated on their magnetic keepers. The magnets may be held separated the one from the next by a non-ferromagnetic spacer, for example, plastic or even wood, to obtain the correct spacing of the facing pairs along the length of the stator. The two coils lie between the inner facing walls of the extrusion, magnetic flux clearly passing through them. The coils in turn, are affixed to a further extrusion 17, which can be guided by e.g. external bearings, (not shown). This provides a simple and inexpensive method of fabrication. The distance between the faces of the magnets, as determined by the extrusion, and the number of turns of the coils and their width is optimised to provide the maximum force for the least possible dissipation.

It will be appreciated that construction of the above type of motor is simple and inexpensive. Linear motors of any length can be constructed as the coils move parallel to the stator, and do not need to surround it. The armature is formed simply by winding a number of sub-coils, held on a former, and the stator is formed simply by the insertion of series of magnets down longitudinal cavities of the above mentioned extrusion. Expensive and bulky toothed laminations are avoided, so giving rise to a particularly light armature with a corresponding fast speed of response.

I claim:

1. A linear motor comprising:

an armature and a stator moveable relative to one another along a path of movement and having, respectively, first and second sets of magnetic flux generators, the flux generators of the first set being arranged in pairs uniformly spaced at a predetermined pole pitch along the length of said path, the flux generators of each pair being disposed in an opposed relationship to one another to opposite sides of said path and producing magnetic fields across and defining therebetween at least one stator magnetic circuit air gap extending over the length of said path, the polarities of the fields alternating between successive flux generator pairs along said air gap, the second set of flux generators comprising at least two drive coils disposed in said magnetic fields, each drive coil comprising a contiguous set of cylindrical sub-coils, the sub-coils of each set having a pole pitch substantially equal to that of the first set of flux generators, the sub-coils of the respective drive coils being disposed such that their axes are directed laterally of said path so as to extend across said gap and such that the axes of the sub-coils of one set are offset longitudinally of the path from those of the other set by an amount differing from said pole pitch, the sub-coils of a drive coil being arranged such that their axes are spaced apart longitudinally of the motor by a distance substantially equal to their maximum diameters and being energisable such that the mutually adjacent portions of the windings of longitudinally successive sub-coils of a coil produce fields of the same polarity.

2. A linear motor according to claim 1, wherein the sub-coils of each drive coil are arranged such that substantially nowhere are sub-coils of any one of the coils located in the same longitudinal extent of the air gap as sub-coils of the other coil or coils.

3. A linear motor according to claim 1, wherein each sub-coil is dimensioned so as substantially to fill the gap between opposed ones of the flux generators of said one set.

4. A linear motor according to claim 1, wherein there are N drive coils and the sub-coils of each of the drive coils are offset from those of the other drive coils by 1/N times the pole pitch.

5. A linear motor according to claim 1, wherein there is a single magnetic circuit air gap and the sub-coils of each drive coil are located in discrete, non-overlapping longitudinal regions of the armature, and thereby occupy discrete, non-overlapping longitudinal regions of the armature.

6. A linear motor according to claim 1, wherein there are two drive coils which are offset from one another along the armature by half the pole pitch.

7. A linear motor according to claim 1, wherein there are at least two such air gaps defined by the flux generators of the first set and the sub-coils of each drive coil are located in a respective one of said air gaps.

8. A linear motor according to claim 7, wherein the stator comprises at least two channels extending along the path of travel, into which respective ones of the flux generators of the armature extend, the opposed ones of each pair of flux generators of the stator facing across one of said channels.

9. A linear motor according to claim 8, wherein each sub-coil is located in a respective one of said channels.

10. A linear motor according to claim 8, wherein all the sub-coils of each drive are located in the same respective one of said channels.

11. A linear motor according to claim 1, wherein the flux generators of the stator are permanent magnets.

12. A linear motor according to claim 1, in which the flux generators of the stator are permanent magnets and the flux generators of the armature are contiguous coils.

13. A linear motor according to claim 1, in which the flux generators are permanent magnets which are of cylindrical circular construction.

14. A linear motor according to claim 13, wherein the magnets are separated by a distance substantially equal to their diameters.

15. A linear motor according to claim 1, wherein the sub-coils of each drive coil are each wound as a circular annulus.

16. A linear motor according to claim 1, wherein the stator comprises at least one elongate member on which the flux generators thereof are mounted, the elongate member being formed from an extrusion.

* * * * *